United States Patent
Riedl

(10) Patent No.: US 11,846,353 B2
(45) Date of Patent: Dec. 19, 2023

(54) GASKET RING AND FLANGE CONNECTION USING SUCH GASKET RING

(71) Applicant: FH Muenster—University of Applied Sciences, Steinfurt (DE)

(72) Inventor: Alexander Riedl, Steinfurt (DE)

(73) Assignee: FH MUENSTER—UNIVERSITY OF APPLIED SCIENCES, Muenster (DE)

( * ) Notice: Subject to any disclaimer, the term of this patent is extended or adjusted under 35 U.S.C. 154(b) by 0 days.

(21) Appl. No.: 17/641,724

(22) PCT Filed: Sep. 28, 2020

(86) PCT No.: PCT/EP2020/077038
§ 371 (c)(1),
(2) Date: Mar. 9, 2022

(87) PCT Pub. No.: WO2021/094027
PCT Pub. Date: May 20, 2021

(65) Prior Publication Data
US 2022/0299113 A1 Sep. 22, 2022

(30) Foreign Application Priority Data
Nov. 14, 2019 (EP) .................................... 19209168

(51) Int. Cl.
*F16J 15/10* (2006.01)
*F16L 23/22* (2006.01)

(52) U.S. Cl.
CPC .......... *F16J 15/104* (2013.01); *F16J 15/102* (2013.01); *F16L 23/22* (2013.01)

(58) Field of Classification Search
CPC .......... F16J 15/10; F16J 15/102; F16J 15/104; F16L 23/22
See application file for complete search history.

(56) References Cited

U.S. PATENT DOCUMENTS

| | | | |
|---|---|---|---|
| 6,682,080 B2 | 1/2004 | Miyaoh | |
| 7,350,833 B2 * | 4/2008 | Bongiorno | F16L 23/04 |
| | | | 285/365 |
| 9,109,700 B2 | 8/2015 | Scholz | |
| 2005/0200128 A1 | 9/2005 | Bongiorno | |
| 2005/0200129 A1 | 9/2005 | Bongiorno | |
| 2017/0074437 A1 | 3/2017 | Briggs | |

FOREIGN PATENT DOCUMENTS

| | | | | |
|---|---|---|---|---|
| DE | 102010060981 B3 * | 5/2012 | ............. | F16J 15/061 |
| EP | 0 187 554 A1 | 7/1985 | | |
| EP | 0177709 A | 4/1986 | | |
| WO | 2012/041381 A1 | 4/2012 | | |

* cited by examiner

*Primary Examiner* — Gilbert Y Lee
(74) *Attorney, Agent, or Firm* — Norris McLaughlin, P.A.

(57) ABSTRACT

In a gasket ring for sealing flange connections and flange connections including the gasket ring, preferably connections of flanges made of plastic, in the radial direction the gasket ring is subdivided into a primary gasket ring and a secondary gasket ring, both rings being concentrically arranged and connected to each other, the secondary gasket ring being arranged on the radial outside of the primary gasket ring, the modulus of elasticity of material of the secondary gasket ring being at least 10 times higher than the modulus of elasticity of the material of the primary gasket ring, the secondary gasket ring in the major part of its radial extension having an axial main height smaller than the maximum axial height of the primary gasket ring.

9 Claims, 5 Drawing Sheets

Surface pressure in radial direction

GASKET RING AND FLANGE CONNECTION USING SUCH GASKET RING

Figure 1:
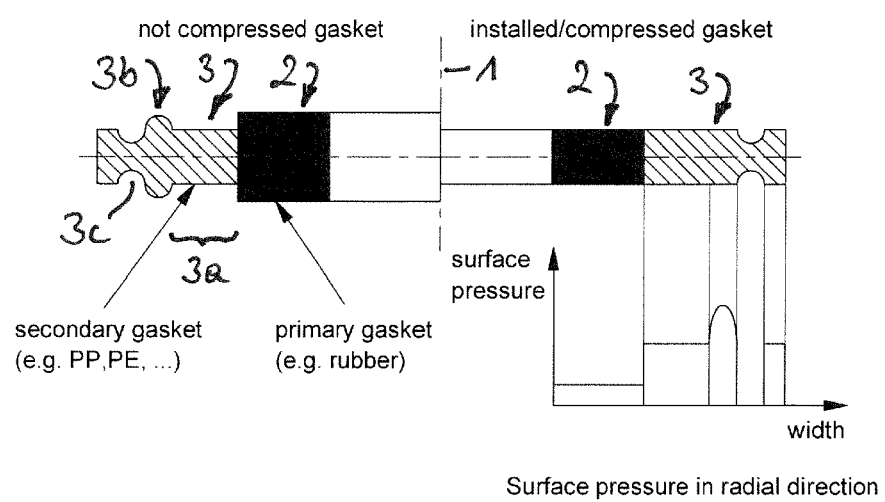

The invention relates to a gasket ring for sealing flange connections, preferably connections of flanges made of plastic and any other "weak" flanges with limited bolt load or gasket surface pressure. The invention furthermore relates to a flange connection between two flanges, preferably flanges made of plastic, the connection being established with such gasket ring. Plastic flanges may be made of any kind of plastic material, for example made of Polypropylene (PP), Polyethylene (PE), Polyvinylidene fluoride (PVDF), Polytetrafluoroethylene (PTFE) or Fibre reinforced plastic (FRP). The invention is not restricted to plastic flanges and may be applied to metallic flanges as well.

The feature "ring" does not restrict the invention to gasket rings having a circular shape in the plane of the gasket ring, even though such a circular shape is disclosed and preferred. Preferably, in the invention a gasket ring is understood to have a closed circumferential extension (by 360 degrees) in any shape around an inner opening. Accordingly, a gasket ring can be understood as a frame as well. Preferably, the gasket ring may have a symmetry around a central axis intersecting the plane of the gasket ring, most preferred a rotational symmetry.

Gasket rings and flange connections established by gasket rings are well known in the state of the art. Typically, a gasket ring, particularly a gasket ring used to seal plastic flanges is made of a single material, for example made of rubber or Polytetrafluoroethylene. Rubber rings typically suffer from degradation by time and PTFE rings suffer from creeping effects, both leading to a leakage over time, particularly if such a gasket is positioned in the main load connection of the flanges.

Accordingly, it is an object of the invention to provide an improved gasket ring and a flange connecting established by such a ring that is more reliable, remains tight even over longer times and withstands external forces and moments without any influence on the sealing performance.

This object is solved by a gasket ring that is in the radial direction subdivided into a primary gasket ring (typically rubber with low modulus of elasticity) and a secondary gasket ring (typically the flange material with a significantly higher modulus of elasticity), both gasket rings being concentrically arranged and connected to each other.

Preferably, a radial direction is regarded in the plane of a gasket ring from any point inside the gasket ring, in particular from a center in the ring towards any point outside the gasket ring.

According to the invention the secondary gasket ring is arranged on the radial outside of the primary gasket ring and the modulus of elasticity of material of the secondary gasket ring is at least 10 times higher than the modulus of elasticity of the material of the primary gasket ring. Furthermore, the secondary gasket ring in the major part of its radial extension has an axial height, named main height being smaller than the maximum axial height of the primary gasket ring. The major part of the radial extent is understood to be more than 50% of the entire radial extent, particularly a non-interrupted part of more than 50% of the entire radial extent.

A flange connection established with such a gasket ring has significant advantages over the state of the art. The different modulus of elasticity of the respective rings provide that the primary gasket ring having the lower modulus of elasticity is always positioned in an force shunt connection of the flanges that is caused by the secondary gasket ring having the higher modulus of elasticity and thus being positioned in the main load connection of the flanges. That means the load on the primary gasket remains constant over the whole lifetime of the flange connection. Accordingly, the primary gasket ring can withstand even dynamic loads over long times without leakage.

The primary gasket ring will be compressed by tightening the flange connection and provides a main seal by the fact that it has an axial height being higher than the mentioned main height of the secondary gasket ring. But in this seal, provided by the primary gasket ring, too much compression is avoided by the secondary gasket ring that is stiffer than the primary gasket ring and consequently inhibits or at least restricts further compression of the primary gasket ring if the flange surfaces come into contact with the secondary gasket ring in the major part of its radial extension where is has a main height being smaller than the maximum height of the primary gasket ring. Accordingly, the secondary gasket ring essentially safeguards the functionality of the primary gasket ring.

According to an improved embodiment the secondary gasket ring may comprise at least one axial protrusion on either axial side, preferably the protrusions on either side having the same radial position. The axial height of the secondary gasket ring between the axial ends of the protrusions on either side is bigger than the main height and smaller than or equal to the maximum height of the primary gasket ring. Accordingly, simultaneously or slightly after a contact between the flanges and the primary gasket seal at least the respective axial ends of the mentioned protrusions come also into contact with the flanges and will be compressed thus providing a secondary sealing effect.

The protrusions will have a respective radial extent that is smaller than the extent of the mentioned major part of the secondary gasket ring thus making certain that contacting the major part by the flanges will essentially stop or at least restrict further tightening of the flanges. The pressure exerted on the protrusion with the flanges will be higher than the pressure exerted by the flanges on the primary gasket ring, which proves that the primary gasket ring remains in the force shunt connection of the flanges.

A respective axial protrusion may have a constant axial height or preferably may be tapered in axial direction, preferably forming a tip, most preferred a tip being positioned centrically within the radial extent of the protrusion. The protrusion may also have, in axial cross-section, a curved, preferably semi-circular end. The latter embodiments make sure, that the pressure exerted by the flanges on the respective protrusion is the highest in the exact middle of the protrusion thus avoiding any kink in the protrusion.

According to another improvement the secondary gasket ring may comprise at least one axial recess on either axial side, preferably the recesses on either side having the same radial position, the axial height of the secondary gasket ring between the axial ends of the recesses on either side being smaller than the main height. In this embodiment the respective recess may be tapered towards its bottom, particularly essentially being formed semi-circular in axial cross-section.

A recess may be positioned in direct neighbourhood of a protrusion, preferably at is radial outside. This provides a significant local decrease of the exerted pressure, having the advantage that the residual height of the compressed protrusion is equal or at least very close to the height of the main height/thickness of the secondary gasket.

A recess and at least one neighboured protrusion, preferably respective neighboured protrusions on either radial side of a recess may be simultaneously produced by crimping a bead into the secondary gasket ring.

Preferably, in all embodiments the secondary gasket ring may have in the major part of its radial extent a uniform axial main height. This assures maximum restriction of further compressing the primary gasket ring when installing and tightening the flanges.

Furthermore, the primary gasket ring may have a uniform axial height along its entire radial extent where it contacts the flanges. This assures that the primary gasket ring will be uniformly compressed without any local load peaks.

According to the invention the two gasket rings are connected to each other what avoids a separation of the rings when tightening the flanges.

Preferably, the primary gasket ring and the secondary gasket ring may be connected by fusing or gluing or injection moulding and/or a form-closed link. Particularly, an element forming the secondary gasket ring may be positioned in a mould. By means of injection moulding a material forming the primary gasket ring after cooling down may be injected into the mould and may enter and fill a recess, preferably an undercut recess thus providing a stable connection.

In all embodiments the primary gasket ring may be made of any rubber material, preferably made of acrylonitrile butadiene rubber (NBR), hydrogenated acrylonitrile butadiene rubber (HNBR), ethylene propylene diene rubber (EPDM), fluoro natural rubber (FKM or FPM), perfluoro-natural rubber (FFKM or FFPM). The secondary gasket ring may be made of Polyethylene (PE), Polypropylene (PP), Polyvinylidene fluoride (PVDF), Polytetrafluoroethylene (PTFE), fibre reinforced plastic (FRP) or any other material with an at least 10 times higher modulus of elasticity than the material of the primary gasket. Most preferred the material of the secondary gasket ring may be made of the same material as the flanges that shall be connected. This provides the advantage that the respective coefficients of thermal expansion are the same for the flanges and the secondary gasket. Any thermal problem will be avoided this way.

PREFERRED EMBODIMENTS ARE SHOWN IN THE DRAWINGS

FIG. 1 shows with respect to a middle axis 1 of the gasket ring on the left side the non-compressed gasket ring and on the right side the compressed gasket ring of the invention.

It can clearly be seen that the gasket ring is subdivided into two connected rings, the primary gasket ring 2 and the secondary gasket ring 3. The primary gasket ring 2 has a uniform axial height along its entire radial extent. The axial extent is along the axis 1, whereas the radial extent is perpendicular to axis 1.

The secondary gasket ring 3 also has a uniform height along the major part 3a of its entire radial extent, preferably along more than 50%, more preferred more than 60% of its entire radial extent. Since this height is given in the major part, the height is also named main height. This height is not necessarily uniform in all possible embodiments, but in the shown one.

The main height is less than the maximum height of the primary gasket ring, which is uniform in the shown case.

This means that by tightening the flanges the primary gasket ring 2 will provide the primary seal. Furthermore, the compression of the primary gasket ring 2 will be restricted upon contact of the flanges with the secondary gasket ring 3 in its major part 3a.

It can also be seen that the secondary gasket ring 3 has respective protrusions 3b on either axial side of the gasket ring, the protrusions 3b being on the same radial position and having a height bigger than the main height. The protrusions are positioned outside, preferably adjacent the major part having the named main height. Furthermore, on the radial outside of the protrusion respective recesses 3c are formed on either axial side on the same radial positions having an axial height being smaller than the main height.

On the right side of FIG. 1 the compressed state is shown, proving that the compression of the primary gasket ring is restricted essentially to the axial height of the secondary gasket ring in its major part 3a. Furthermore, the protrusions are completely pressed flat.

This leads to a pressure diagram shown below the gasket ring construction. It can be seen that the pressure is higher at the position of the secondary gasket ring and is highest at the position of the protrusion. Accordingly, the secondary gasket ring is positioned in the main load connection of the flanges and the primary gasket in the force shunt connection of the flanges.

In this embodiment the primary gasket ring may be made of rubber having a modulus of elasticity of 5 MPa, whereas the secondary gasket ring may be made of Polyethylene, having a modulus of elasticity of 70 MPa, being more than 10 times higher.

The connection between the two gasket rings may be established by gluing.

Figure 2:
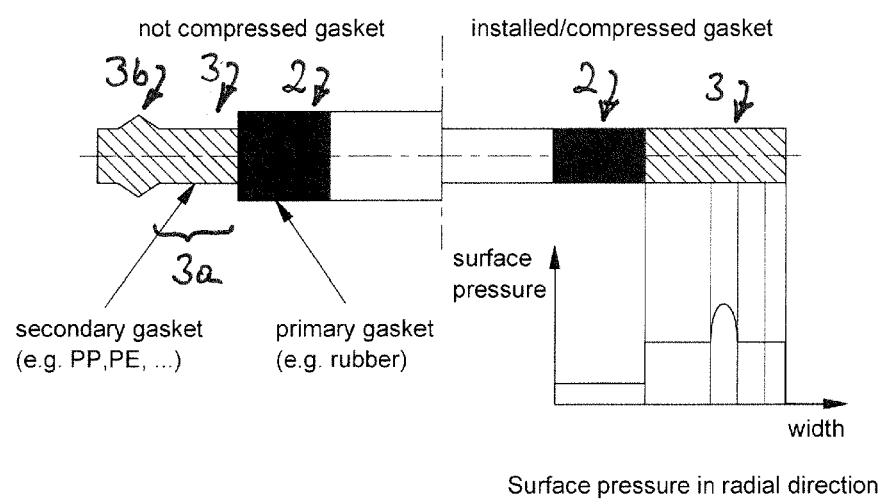

FIG. 2 shows another embodiment in which the secondary gasket rings does have a tip shaped protrusion that tapers linearly in axial direction to a point. There is no recess in the secondary gasket ring. In addition, here the pressure diagram proves the primary gasket ring to be positioned in the force shunt connection of the flanges. This maintains a long term stability of the primary gasket ring.

Figure 3:
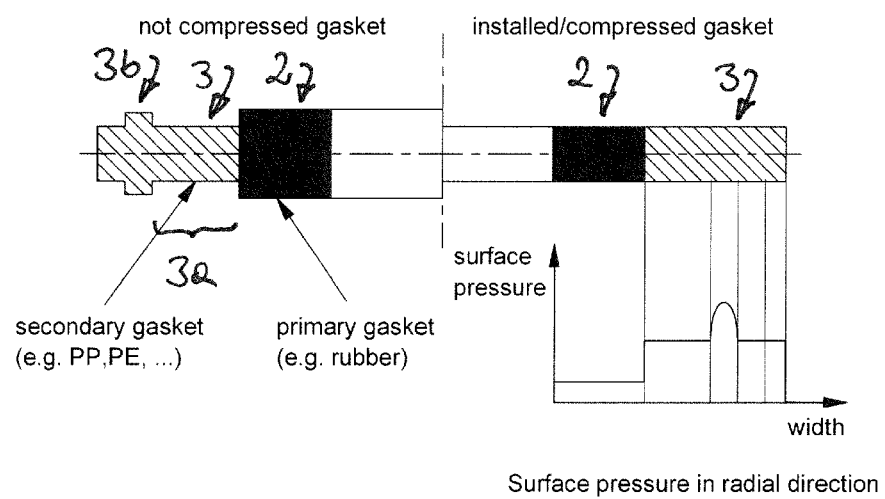

FIG. 3 shows another different embodiment of the shape of the protrusion, that is provided with a constant height along it entire radial extension.

Figure 4:
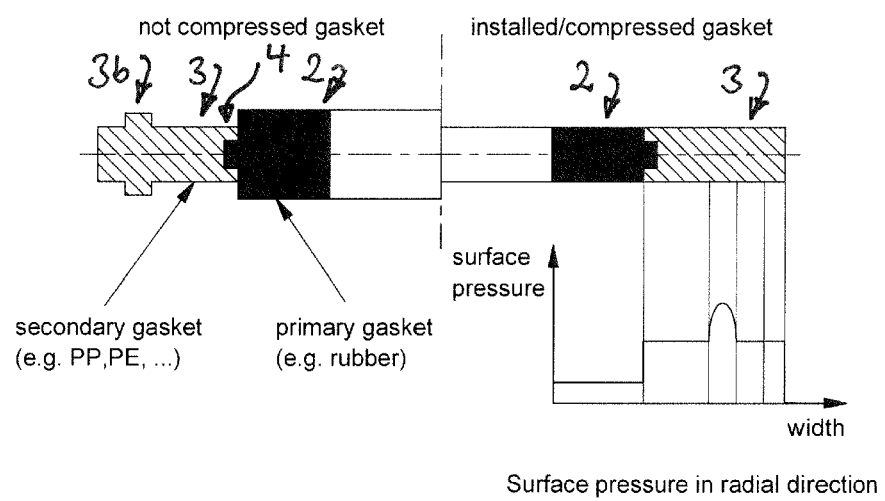
Figure 5:
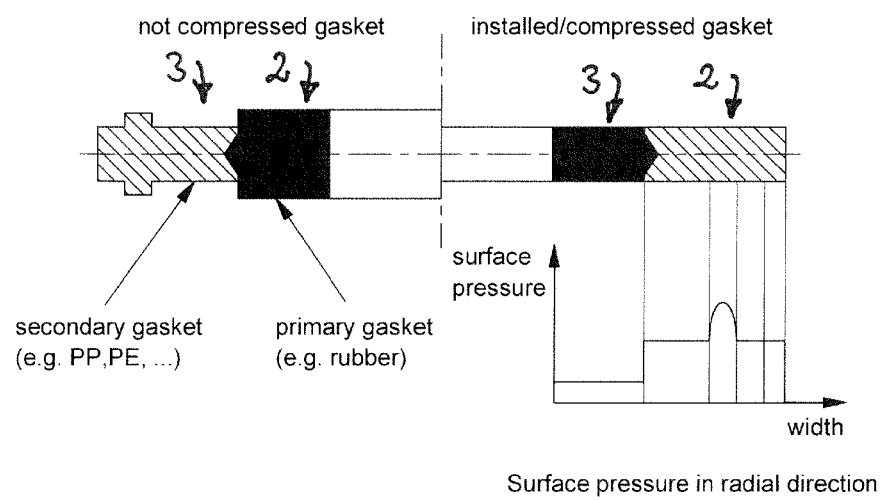

FIGS. 4 and 5 show a form closed link 4 between the primary and secondary gasket ring. For example, material of the primary gasket ring 2 may be injected into a recess in the radial side face of the secondary gasket ring 3 in an injection moulding process in which the already existing secondary gasket ring 3 is positioned in the mould prior to the injection of the material that forms the primary gasket ring 2.

The invention claimed is:

1. A gasket ring for sealing flange connections, comprising a primary gasket ring and a secondary gasket ring, the primary and secondary gasket rings being concentrically arranged and connected to each other, the secondary gasket ring being arranged on the radial outside of the primary gasket ring, a modulus of elasticity of a material of the secondary gasket ring being at least 10 times higher than a modulus of elasticity of a material of the primary gasket ring, the secondary gasket ring in a major part of its radial extent having an axial main height smaller than a maximum axial height of the primary gasket ring, wherein the secondary gasket ring comprises a respective at least one axial protrusion on each axial side thereof, an axial height of the secondary gasket ring between axial ends of each of the at least one axial protrusion on each axial side being bigger than the axial main height and smaller than or equal to the maximum axial height of the primary gasket ring.

2. The gasket ring according to claim 1, wherein each of the at least one axial protrusion has a uniform axial height or is symmetrically tapered in an axial direction to form a pointed tip or has an end which is curved in an axial cross-section.

3. The gasket ring according to claim 2, wherein the curved end of the at least one axial protrusion is semicircular in the axial cross-section.

4. The gasket ring according to claim 1, wherein the primary gasket ring is made of a rubber material.

5. The gasket ring according to claim 4, wherein the rubber material is acrylonitrile butadiene rubber (NBR), hydrogenated acrylonitrile butadiene rubber (HNBR), ethylene propylene diene rubber (EPDM), fluoro-natural rubber (FKM or FPM), or perfluoro-natural rubber (FFKM or FFPM).

6. The gasket ring according to claim 1, wherein the secondary gasket ring is made of polyethylene (PE), polypropylene (PP), polyvinylidene fluoride (PVDF), polytetrafluoroethylene (PTFE) or fiber-reinforced plastic (FRP).

7. The gasket ring according to claim 1, wherein the at least one axial protrusion on a first axial side of the secondary gasket ring has a same position as the at least one axial protrusion on a second axial side of the secondary gasket ring.

8. The gasket ring according to claim 7, wherein the secondary gasket ring comprises a respective at least one axial protrusion on each axial side thereof, an axial height of the secondary gasket ring between axial ends of the at least one axial protrusion on each axial side being bigger than the axial main height and smaller than or equal to the maximum axial height of the primary gasket ring.

9. The gasket ring according to claim 8, wherein the curved end of the at least one axial protrusion is semicircular in the axial cross-section.

\* \* \* \* \*